United States Patent [19]

Lindner

[11] Patent Number: 5,688,177
[45] Date of Patent: Nov. 18, 1997

[54] TRANSMISSION SYSTEM FOR A MOTOR VEHICLE, THE TRANSMISSION SYSTEM HAVING A FLYWHEEL WITH TWO CENTRIFUGAL MASSES

[75] Inventor: Joachim Lindner, Schweinfurt, Germany

[73] Assignee: Fichtel & Sachs AG, Schweinfurt, Germany

[21] Appl. No.: 568,414

[22] Filed: Dec. 6, 1995

[30] Foreign Application Priority Data

Dec. 7, 1994 [DE] Germany .................. 44 43 453.7

[51] Int. Cl.⁶ ................................. F16F 15/16
[52] U.S. Cl. ................ 464/68; 192/213.2; 192/213.22; 464/63
[58] Field of Search ..................... 464/24, 63, 66, 464/68; 192/55.4, 202, 210, 210.1, 211, 213.2, 213.21, 23.21; 74/574

[56] References Cited

U.S. PATENT DOCUMENTS

| | | | |
|---|---|---|---|
| 4,852,424 | 8/1989 | Grassmuck et al. | 192/210.1 X |
| 4,889,218 | 12/1989 | Chasseguet et al. | 464/68 X |
| 5,119,692 | 6/1992 | Naudin . | |
| 5,119,693 | 6/1992 | Naudin et al. | 44/68 X |
| 5,125,872 | 6/1992 | Reik | 464/68 X |
| 5,135,092 | 8/1992 | Jackel | 464/68 X |
| 5,307,710 | 5/1994 | Feldhaus et al. | |
| 5,353,664 | 10/1994 | Yamamoto | 464/68 X |
| 5,377,560 | 1/1995 | Schierling et al. | 464/68 X |

FOREIGN PATENT DOCUMENTS

| | | |
|---|---|---|
| 3515928 | 11/1986 | Germany . |
| 4128868 | 3/1993 | Germany . |
| 2157801 | 10/1985 | United Kingdom . |
| 2168780 | 6/1986 | United Kingdom . |
| 2186054 | 8/1987 | United Kingdom . |
| 2229793 | 10/1990 | United Kingdom . |

*Primary Examiner*—Daniel P. Stodola
*Assistant Examiner*—Eileen A. Dunn
*Attorney, Agent, or Firm*—Nils H. Ljungman and Associates

[57] ABSTRACT

For a flywheel which has two centrifugal masses and is located in the drive train of a motor vehicle, which two centrifugal masses can rotate in relation to one another and can be guided by a bearing, the bearing neck which holds the bearing on the first centrifugal mass can include a multiplicity of disc-shaped neck parts. These neck parts can be firmly fastened to one another, and to the first centrifugal mass, by rivets. The individual neck parts can be centered relative to one another and to the first centrifugal mass by centering members, independently of the rivets.

19 Claims, 8 Drawing Sheets

III - III

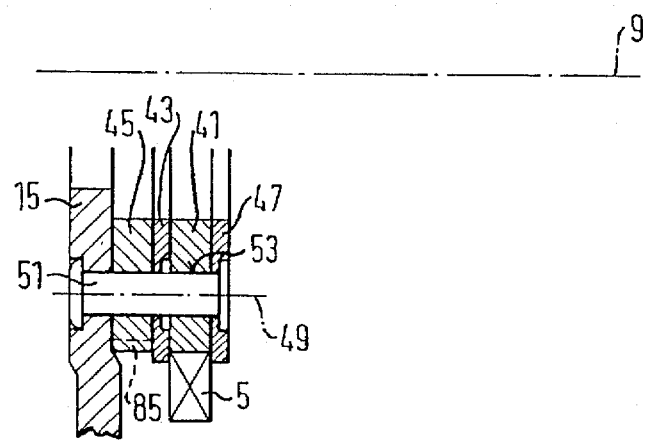
Fig. 3a
IIIa-IIIa
Fig. 4
IV-IV
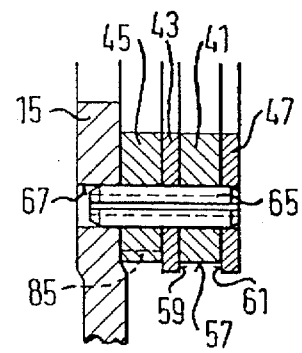
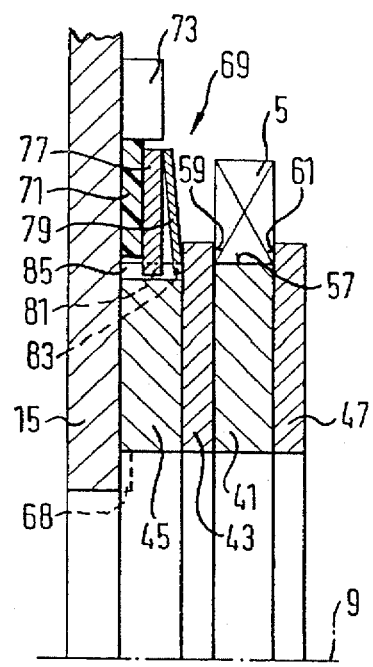
Fig. 5

VII-VII

VIIa-VIIa

IX-IX

IXa-IXa

TRANSMISSION SYSTEM FOR A MOTOR VEHICLE, THE TRANSMISSION SYSTEM HAVING A FLYWHEEL WITH TWO CENTRIFUGAL MASSES

BACKGROUND OF THE INVENTION

1. Field of the Invention

The present invention generally relates to a flywheel which has two centrifugal masses and is located in the drive train of a motor vehicle, which motor vehicle is powered by an internal combustion engine.

2. Background Information

Conventional flywheels with two centrifugal masses such as, for example, the flywheels described in German Patent Publication Published for Opposition Purposes No. 4 128 868 (corresponding to U.S. Pat. No. 5,307,710), have two centrifugal masses which are fastened rotationally and equiaxially to one another. The first (primary centrifugal mass) of the two centrifugal masses can be fastened to a crankshaft of the internal combustion engine, e.g. by means of bolts, and the second (secondary centrifugal mass) of the two is rotationally fastened by fastening means relative to the first centrifugal mass by means of a bearing, generally a roller bearing, on a bearing neck or flange. The bearing neck or flange is fixed in position relative to the first centrifugal mass. The fastening means, which once again can be bolts or screws, can hold the bearing neck directly on the first centrifugal mass, or can be used to create a joint fastening of the first centrifugal mass and of the bearing neck on the crankshaft. The two centrifugal masses are rotationally elastically connected to one another by means of a torsional vibration damper. The second centrifugal mass carries components of a friction clutch, which friction clutch is located in the drive train downstream of the flywheel.

In conventional flywheels with two centrifugal masses, the bearing neck is realized in the form of a molding which must typically be manufactured by machining, e.g. on a lathe, and is therefore relatively complex and expensive.

OBJECT OF THE INVENTION

The object of the present invention is to create a flywheel with two centrifugal masses which can be manufactured more economically. A particular object of the present invention is to make it possible to manufacture the bearing neck required for the two centrifugal masses in a manner which is significantly simpler than that utilized in conventional flywheels.

SUMMARY OF THE INVENTION

The present invention is based on a flywheel, which flywheel has two centrifugal masses and is to be installed in the drive train of a motor vehicle powered by an internal combustion engine, and which flywheel can include:
- a first centrifugal mass, which first centrifugal mass can be rotationally fastened to a crankshaft of the internal combustion engine, and which first centrifugal mass can rotate around an axis of rotation;
- a bearing neck, which bearing neck is guided by centering means radially equiaxially relative to the first centrifugal mass;
- fastening means, which fastening means fix the bearing neck in place relative to the first centrifugal mass;
- a second centrifugal mass, which second centrifugal mass can rotate around the axis of rotation relative to the first centrifugal mass; and
- a system of torsional vibration dampers with an input component, which input component is non-rotationally connected to the first centrifugal mass, and an output component, which output component is connected rotationally elastically to the input component, and which output component is non-rotationally connected to the second centrifugal mass.

The present invention teaches that on such a flywheel with two centrifugal masses, the bearing neck can include at least two separate neck parts. The first neck part can form a seat surface for the bearing on its outer periphery, and the second neck part can be located on the side of the first neck part which is axially closer to the crankshaft. The second neck part projects radially beyond the seat surface to form an axial stop shoulder for the bearing. In addition, the centering means radially center the neck parts in relation to one another, independently of the fastening means, and also center the neck parts in relation to the first centrifugal mass.

Instead of a one-piece bearing neck, i.e. one which is relatively difficult to manufacture, the present invention teaches that a multiplicity of neck parts, stacked on top of one another and joined together, can be provided, which neck parts can perform the individual functions of the bearing neck. The neck parts, which neck parts are preferably in approximately the shape of a disc, can be easily realized in the form of stamped parts, and can be modified as necessary and as appropriate to their special function. For example, the first neck part can be ground on its outer peripheral surface to form the seat surface of the bearing. It is typically sufficient if only the first neck piece is ground, since the dimensional accuracy requirements for the other neck parts are not as strict. It has been determined that centerless grinding of the seat surface is a particularly favorable manufacturing technology.

The centering means can preferably be realized so that they directly or indirectly center the first neck part, which first neck part forms the seat surface of the bearing relative to the first centrifugal mass. In this manner, the second centrifugal mass, which for its part is centered by means of the bearing on the seat surface and thus on the first neck part, can be centered with relatively tight tolerances relative to the first centrifugal mass, and thus relative to the crankshaft. Since the centering means are independent of the fastening means provided for the fastening of the neck parts relative to one another and relative to the first centrifugal mass, the assembly and installation procedures can also become easier. In particular, fastening means with relatively broad tolerances can be used.

In a first and preferred configuration of the present invention, the centering means can include several adapter sleeves, which adapter sleeves can provide radial support, can be offset in the peripheral direction, and can extend in their longitudinal dimension in the direction of the axis of rotation. The adapter sleeves can be clamped in holes, which holes are oriented axially in relation to one another, at least in the first centrifugal mass, in the first neck part, and in each of the neck parts located axially between the first centrifugal body or mass and the first neck part. The adapter sleeves can preferably orient the first neck part, which first neck part forms the seat surface of the bearing, directly relative to the first centrifugal mass. In this manner, it can become possible to achieve particularly close tolerances.

In a second preferred embodiment of the present invention, the first centrifugal mass, the first neck part, and each of the neck parts located axially between the first centrifugal mass and the first neck part, can have centering surfaces which radially center these components which are located axially next to one another, in relation to one another. In this variant, the neck part which forms the seat surface of the bearing can be centered indirectly by means of the neck parts which are located between the first neck part and the first centrifugal mass in the stack of neck parts. In this system, only a few relatively easily-manufactured parts are required.

To connect the neck parts to one another and possibly also to the first centrifugal mass, consideration might also be given to using the elements such as the screws which are conventionally provided to fasten the first centrifugal mass to the crankshaft. To make the assembly and installation procedure simpler and less subject to problems, however, one preferred solution is to have the fastening means comprise a multiplicity of rivets offset in the peripheral direction and extending through the first centrifugal mass, the first neck part, and each of the neck parts located axially between the first centrifugal mass and the first neck part, in holes which are oriented axially in relation to one another, and to fasten the neck parts to the first centrifugal mass. During the installation of the first centrifugal mass on the crankshaft, therefore, it is essentially no longer necessary to pay attention to the centering of the neck parts relative to the first centrifugal mass. The rivets can also serve to hold the flywheel with two centrifugal masses together during transport.

The bearing which sits on the first neck part can be fixed in position axially on the side closer to the crankshaft by the second neck part. The fixing on the side farther from the crankshaft could, for example, be accomplished by means of a retaining ring or similar device inserted into a peripheral groove of the first neck part. The manufacture of such a groove, however, would typically require additional machining steps. In terms of manufacturing technology, it can be easier, on the side of the first neck part which faces away from the second neck part, to install a cover plate which projects radially beyond the seat surface to form an axial stop shoulder for the bearing. Preferably, the rivets discussed above can also extend through the cover plate, and fasten the cover plate and the neck parts to the first centrifugal mass.

The rivets provided for the fastening of the cover plate can also provide the radial centering of the cover plate relative to the first centrifugal mass. The tolerances which can be achieved in this manner are typically sufficient for this purpose. If, as described above, adapter sleeves are used to center the neck parts, the adapter sleeves can also be used simultaneously to center the cover plate.

In variant embodiments with adapter sleeves used to center the neck parts, the rivets provided, as indicated above, to fasten the neck parts to the first centrifugal mass can also be offset in the peripheral direction in relation to the adapter sleeves. However, that requires a relatively high number of holes through the neck parts, which can complicate the manufacturing process and can also reduce the load-bearing cross section of the neck parts. These disadvantages can be essentially eliminated if at least some of the rivets, but preferably all of the rivets, each extend through respective adapter sleeves.

Although the neck parts can each be shaped differently, at least some of the components which form the bearing neck can preferably be shaped essentially alike, to keep the manufacturing cost low. It has been found to be advantageous if the cover plate and the second neck part have essentially the same shape. Located axially between the second neck part and the first centrifugal mass, there can also be a third neck part, to increase the distance between the first neck part which forms the bearing seat and the first centrifugal mass. The first and the third neck part can also have essentially the same shape. The third neck part can therefore have a smaller outside diameter than the second neck part, whereby the first centrifugal mass and the second neck part can project radially beyond this smaller outside diameter. The ring-shaped depression which results can be utilized for the installation and axial support of ring elements of a friction device of the system of torsional vibration dampers. At least one of these ring elements which coaxially surround the third neck part, as well as the third neck part, can have interlocking mechanisms which non-rotationally connect this one ring element to the third neck part, but allow it to move axially. Axially bent tabs or similar devices, like those which are known in the art for the non-rotational connection of ring elements of the friction device with lateral discs of rotational vibration dampers, can thereby essentially be eliminated, which can simplify the process of manufacturing the ring elements.

On embodiments which, as indicated above, include a third neck part, the second neck part can also be used for the centering of the first neck part on the third neck part. For example, the second neck part can have axially-projecting centering projections or lugs on axially opposite sides, which projections radially center the first neck part on one hand, and the third neck part on the other hand, in relation to one another. Since the material thickness of the second neck part is generally less than that of the first and third neck parts, the manufacturing process can thereby be further simplified. It is apparent that alternatively, the first and the third neck parts, on their sides facing one another axially, can also have centering projections which project axially, which projections radially center the first and the third neck parts relative to one another on the second neck part. If the first and the third neck parts are realized in a rotationally symmetrical fashion, components having essentially the same shape can also be used in this location.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

One aspect of the invention resides broadly in a transmission system for a motor vehicle, the transmission system comprising: a flywheel assembly, the flywheel assembly having an axis of rotation and defining an axial direction parallel to the axis of rotation; a pressure plate disposed adjacent the flywheel assembly; a clutch disc disposed between the pressure plate and the flywheel assembly; the clutch disc comprising friction linings for contacting the pressure plate and the flywheel assembly upon engagement of the clutch disc; a clutch housing disposed adjacent the pressure plate and being releasably fastened to the flywheel assembly; the pressure plate being movably fastened to the clutch housing; the pressure plate comprising apparatus for engaging the clutch disc with the flywheel assembly; the flywheel assembly comprising: a first flywheel portion, the first flywheel portion comprising apparatus for fastening the first flywheel portion to a crankshaft of an internal combustion engine; a second flywheel portion disposed adjacent the first flywheel portion, the second flywheel portion being rotatable with respect to the first flywheel portion; bearing apparatus for guirespect to the first flywheel portion with respect to the first flywheel portion; apparatus for mounting the bearing apparatus; apparatus for fastening the mounting apparatus to the first flywheel portion; the mounting apparatus comprising: a first neck part; a second neck part disposed adjacent the first neck part, the second neck part comprising a seat surface for the bearing apparatus; the first neck part comprising an outer portion extending radially outwardly beyond the seat surface of the first neck part and forming a stop shoulder for the bearing apparatus.

Another aspect of the invention resides broadly in a method of assembling a transmission system for a motor vehicle, the transmission system comprising: a flywheel assembly, the flywheel assembly having an axis of rotation and defining an axial direction parallel to the axis of rotation; a pressure plate disposed adjacent the flywheel assembly; a clutch disc disposed between the pressure plate and the flywheel assembly; the clutch disc comprising friction linings for contacting the pressure plate and the flywheel assembly upon engagement of the clutch disc; a clutch housing disposed adjacent the pressure plate and being releasably fastened to the flywheel assembly; the pressure plate being movably fastened to the clutch housing; the pressure plate comprising apparatus for engaging the clutch disc with the flywheel assembly; the flywheel assembly comprising: a first flywheel portion, the first flywheel portion comprising apparatus for fastening the first flywheel portion to a crankshaft of an internal combustion engine; a second flywheel portion disposed adjacent the first flywheel portion, the second flywheel portion being rotatable with respect to the first flywheel portion; bearing apparatus for guiding the second flywheel portion with respect to the first flywheel portion; apparatus for mounting the bearing apparatus; apparatus for fastening the mounting apparatus to the first flywheel portion; the mounting apparatus comprising: a first neck part; a second neck part disposed adjacent the first neck part, the second neck part comprising a seat surface for the bearing apparatus; the first neck part comprising an outer portion extending radially outwardly beyond the seat surface of the first neck part and forming a stop shoulder for the bearing apparatus; the method comprising the steps of: providing a flywheel assembly, the flywheel assembly having an axis of rotation and defining an axial direction parallel to the axis of rotation; providing a pressure plate; providing a clutch disc; providing the clutch disc with friction linings for contacting the pressure plate and the flywheel assembly upon engagement of the clutch disc; providing a clutch housing; providing the pressure plate with apparatus for engaging the clutch disc with the flywheel assembly; providing the flywheel assembly with: a first flywheel portion; apparatus for fastening the first flywheel portion to a crankshaft of an internal combustion engine; a second flywheel portion, the second flywheel portion being rotatable with respect to the first flywheel portion; bearing apparatus for guiding the second flywheel portion with respect to the first flywheel portion; apparatus for mounting the bearing apparatus; apparatus for fastening the mounting apparatus to the first flywheel portion; providing the mounting apparatus with: a first neck part; a second neck part; providing the second neck part with a seat surface for the bearing apparatus; providing the first neck part with an outer portion extending radially outwardly beyond the seat surface of the first neck part and forming a stop shoulder for the bearing apparatus; the method further comprising the steps of: disposing the pressure plate adjacent the flywheel assembly; disposing the clutch disc between the pressure plate and the flywheel assembly; disposing the clutch housing adjacent the pressure plate; releasably fastening the clutch housing to the flywheel assembly; movably fastening the pressure plate to the clutch housing; fastening the first flywheel portion to a crankshaft of an internal combustion engine; disposing the second flywheel portion adjacent the first flywheel portion; fastening the mounting apparatus to the first flywheel portion; mounting the bearing apparatus, with the mounting apparatus, by: disposing the second neck part adjacent the first neck part; and disposing the bearing apparatus at the seat surface of the second neck part and against the stop shoulder of the first neck part.

BRIEF DESCRIPTION OF THE DRAWINGS

Preferred embodiments of the present invention are explained in greater detail below, and are illustrated in the accompanying drawings, in which:

FIG. 1a shows substantially the same view as FIG. 1, but is more detailed;

FIG. 3a is a sectional view of the bearing neck, viewed along a line IIIa—IIIa in FIG. 2;

FIG. 4 is a sectional view of the bearing neck, viewed along a Line IV—IV in FIG. 2;

FIG. 5 is an enlarged detail of the vicinity of the bearing neck of the flywheel which has two centrifugal masses, including a friction device;

DESCRIPTION OF THE PREFERRED EMBODIMENT

Figure 1:
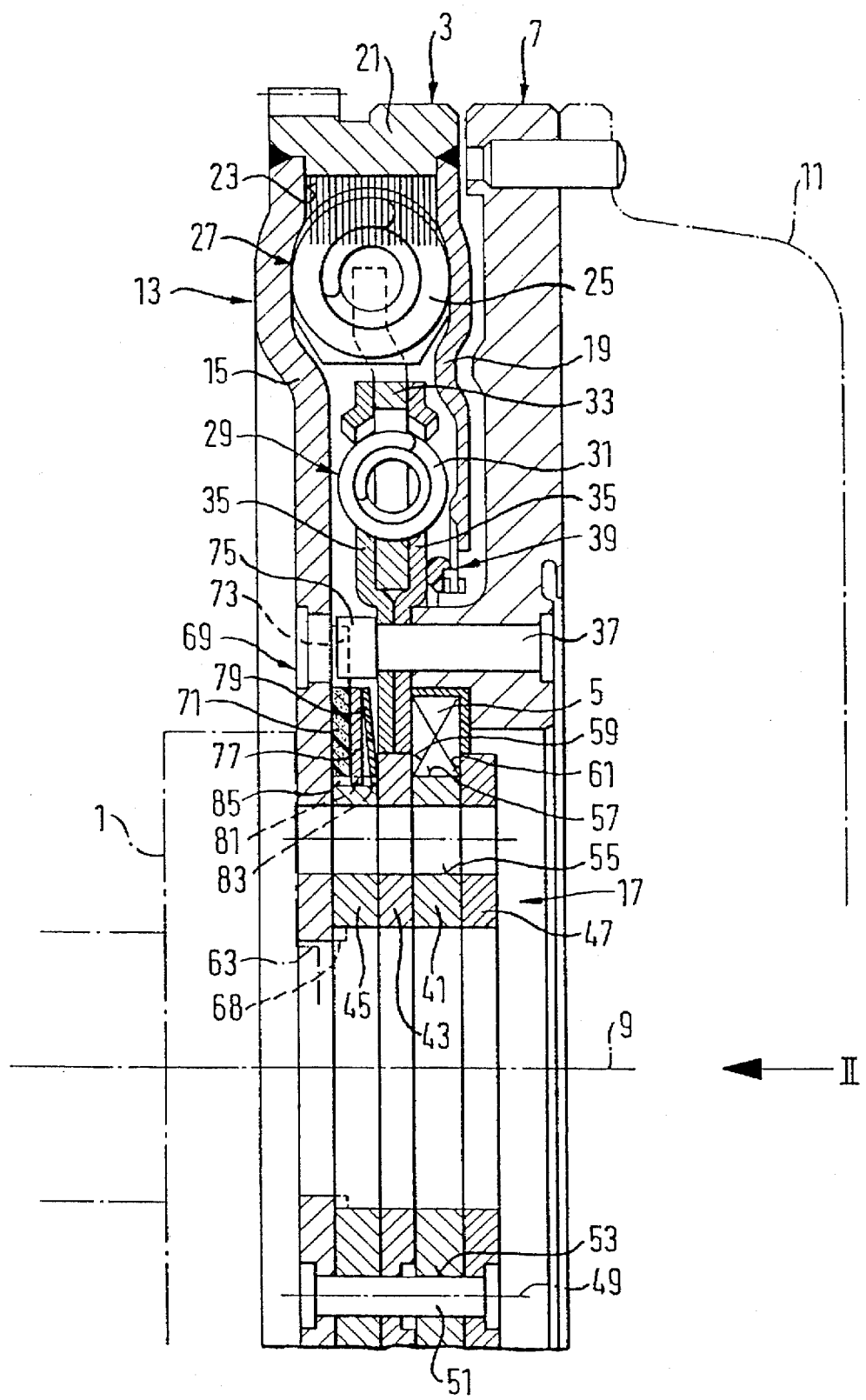
FIG. 1 shows a partial axial longitudinal section through a flywheel which has two centrifugal masses and is located in the drive train of a motor vehicle which is powered by an internal combustion engine, and which has a bearing neck in accordance with the present invention.

FIG. 1 shows a partial longitudinal section through a flywheel which has two centrifugal masses and which can be used in the drive train of a motor vehicle. The flywheel with two centrifugal masses can include a first centrifugal mass 3, which first centrifugal mass 3 can be fastened to a crankshaft 1 of an internal combustion engine (see FIG. 12). On the first centrifugal mass 3, a second centrifugal mass 7 can be mounted by means of a bearing 5, e.g. a cageless ball bearing with balls all the way around, so that the centrifugal mass 7 can rotate around an axis of rotation 9 which it has in common with the crankshaft 1. The second centrifugal mass 7 can essentially have a disc shape, and can carry a conventional friction clutch indicated at 11 (shown schematically only in FIG. 1). The second centrifugal mass 7 can thus preferably form the counter-application plate of the friction clutch 11. One example of a friction clutch assembly is shown in detail in FIG. 11 and is discussed further herebelow. A torsional vibration damper device 13 can connect the two centrifugal masses 3 and 7 to one another, preferably with rotational elasticity.

The first centrifugal mass 3 can include a primary disc 15 which primary disc 15, in the vicinity of its inside periphery, can carry a bearing neck 17 which is described in greater detail below. The bearing 5 can sit on the outside periphery of this bearing neck 17, and can be fixed in position radially and axially. Substantially parallel to the primary disc 15, and at some distance from the primary disc 15, there is a cover plate 19 which can be solidly connected in the vicinity of its outside periphery to the outside periphery of the primary disc 15 by means of a ring 21. In accordance with one embodiment of the present invention, the ring 21 can be attached to the primary disc 15 by means of a first weld 15a, and can be attached to the cover plate 19 by means of a second weld 19a (see FIG. 1a). Together with the primary disc 15 and the cover plate 19, the ring 21 can form a channel 23, which channel 23 concentrically encircles the axis of rotation 9. In the channel 23 there can be coil springs 25 which are part of a first spring stage 27 of the torsional vibration damper system 13. The springs 25 can be actuated by means of stop edges of these components which are not shown in any further detail, but which would be well known to one or ordinary skill in the art. In other words, and in accordance with one embodiment of the present invention, the springs 25 can be actuated by stop edges of the primary disc 15 and the cover plate 19, which stop edges are not shown here, but an example of which can be found in U.S. Pat. No. 5,307,710, which patent is incorporated by reference herein.

Radially inside the vicinity of the first spring stage 27 there is a second spring stage 29, the coil springs 31 of which can be connected to the first spring stage 27 by means of a rotationally-mounted intermediate plate 33. The intermediate plate 33 can rotate relative to the centrifugal masses 3,7 around the axis of rotation 9. The coil springs 25, 27 can be connected so that they act in series in the torque transmission path of the rotational vibration damper system 13. Two side plates illustrated at 35 form an output component of the torsional vibration damper system 13, which output component is in turn connected by means of apertures or striking surfaces or stop edges with the coil springs 27, and the two side plates 35 are connected to the second centrifugal mass 7 by means of a multiplicity of rivets 37 distributed in the peripheral direction. At least the portion of the interior space defined by the primary disc 15, the ring 21 and the cover plate 19, which interior space can contain the coil springs 25, is preferably filled with lubricant. The interior space can preferably be sealed by a dynamic seal 39 located between the cover plate 19 and the side plates 35.

Figure 2:
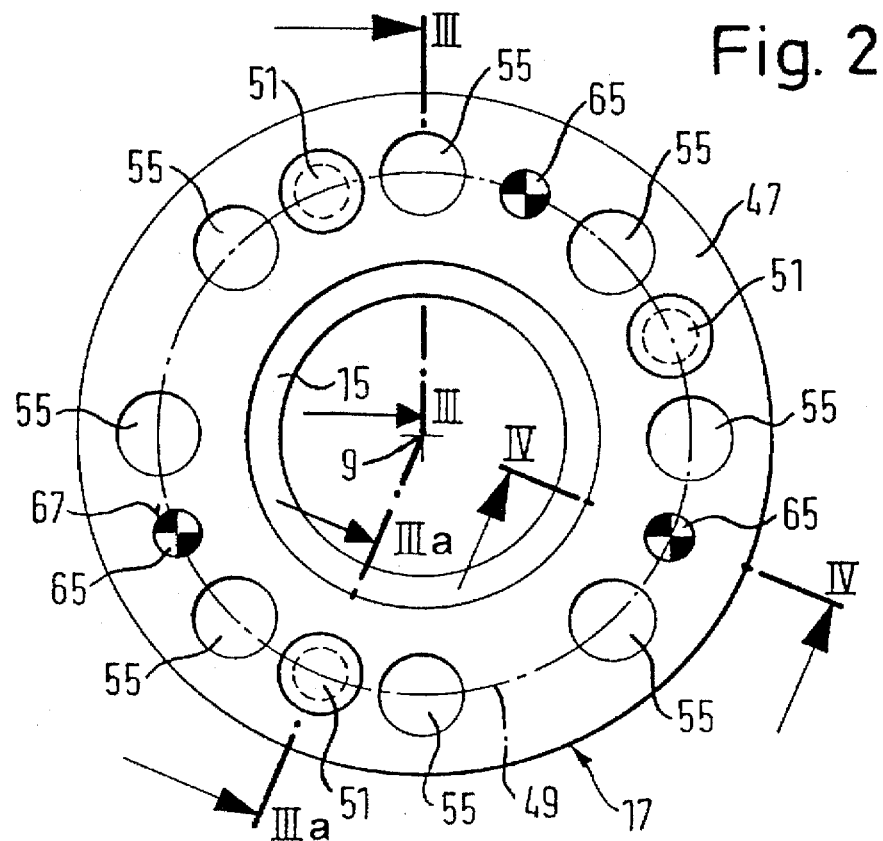
FIG. 2 is an end view of the bearing neck, viewed in the direction indicated by the Arrow II in FIG. 1.
Figure 3:
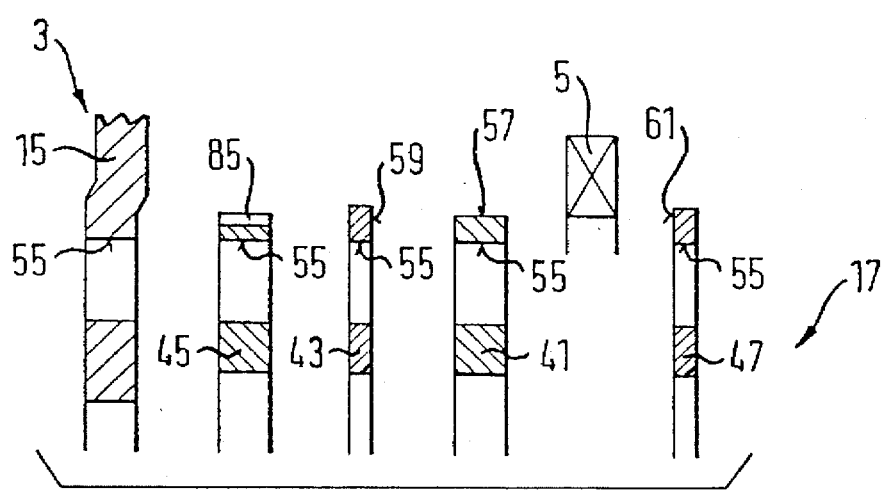
FIG. 3 is a sectional view of the bearing neck, viewed along a line III—III in FIG. 2, which shows an exploded view of the bearing neck.

The bearing neck 17, as also shown in FIGS. 2 to 5, can include a stack of neck parts 41, 43, 45 in the form of ring-shaped discs, and which neck parts 41, 43, 45, together with another ring-shaped cover plate 47, can be firmly connected together and to the primary disc 15 by means of a multiplicity of rivets 51 which are located on a common diameter circle 49 (see FIG. 2). The rivets 51 run through holes 53 which are oriented axially in relation to one another in the components 41, 43, 45 and 47. To fasten the bearing neck 17, plus the first centrifugal mass 3 to the crankshaft 1, there can be additional holes 55 in the components 15 and 41, 43, 45 and 47, through which screws (not shown in any further detail) can be screwed into the crankshaft 1. The holes 55 can preferably be offset in relation to the holes 53, but can lie on the same diameter circle 49.

The neck parts 41, 43 and 45, as well as the cover plate 47, can preferably be stamped, sheet metal parts, i.e. these components can have an essentially constant contour in the axial direction. The neck part 41 can preferably be ground by means of centerless grinding on its outside periphery to form a cylindrical bearing seat or seat surface 57 for the bearing 5. Further, the neck part 41 can have a smaller outside diameter than the neck part 43, which neck part 43 is adjacent to the neck part 41 on the side toward the crankshaft 1, and the cover plate 47, which cover plate 47 is adjacent to the neck part 41 on the opposite side. The neck part 43 and the cover plate 47 can project radially beyond the seat surface 57 and form shoulders 59, 61, which shoulders 59, 61 can fix the bearing 5 in position axially between them. To simplify the manufacturing operations, the neck part 43 and the cover plate 47 can be essentially identical. The neck parts 41, 45 can also be essentially identical, and can also be realized in essentially identical fashion in other variants which are not illustrated.

The bearing neck 17 can center the centrifugal mass 7 by means of the bearing 5, and can thus center the friction clutch 11 relative to the centrifugal mass 3, and thus in relation to the crankshaft 1. For the purpose of centering the neck part 41, which neck part 41 forms the seat surface 57 for the bearing 5, but also the neck parts 43, 45 and the cover plate 47 relative to the primary disc 15, which primary disc 15 can be centered on a neck 63 of the crankshaft 1, there can be several, in this case three, adapter sleeves 65 (see FIGS. 2 and 4). The adapter sleeves 65 can provide radial support and can be offset from one another in the peripheral direction, in holes 67. The holes 67 can be axially aligned with one another in the components 15, 41, 43, 45 and 47. The holes 67 can also preferably be located on the diameter circle 49. It should be apparent that the holes 53 for the rivets 51, the holes 55 for the screws for fastening to the crankshaft 1, and also the holes 67 for the adapter sleeves 65 can be provided on different diameter circles, if desired.

In the embodiment shown in FIGS. 1–4, the adapter sleeves 65 can center the neck parts 41, 43, 45 directly on the primary disc 15. Alternatively, the adapter sleeves 65 could center only the neck parts 41, 43, 45 relative to one another, while a centering collar 68 (see FIG. 5) could be molded onto the primary disc 15 to center the neck part 41 in relation to the primary disc 15. In other words, and in accordance with one embodiment of the present invention, the neck part 45 can be directly centered by the centering collar 68, and, since the adapter sleeves 65 center the neck parts 41, 43 and 45 relative to one another, the centering collar 68 can indirectly center the other neck parts 43 and 41.

In accordance with one embodiment of the present invention, the centering collar 68 could be in the form of an axial projection located on the inner circumference of the primary disc 15. This projection could be in the form of a continuous ring located on the inner circumference of the primary disc 15. Alternatively, there could be ring segments located about the inner circumference of the primary disc 15. In addition to FIG. 5, FIGS. 1 and 1a show one possible location of the centering collar 68, in accordance with one embodiment of the invention.

Axially between the primary disc 15 and the neck part 43, as shown in FIG. 1 and in FIG. 5 in particular, there can preferably be a friction device 69 of the torsional vibration damper system 13. The friction device 69 can have a friction ring 71, which friction ring 71 can be in contact against the primary disc 15. The friction ring 71 can have arms 73, which arms 73 extend radially outward to form a coupling with heads 75 of the rivets 37. By means of the arms 73, the friction ring 71 can preferably be non-rotationally connected to the centrifugal mass 7, but with some play or clearance, and during the rotation of the centrifugal mass 7, the friction ring 71 can be carried along relative to the centrifugal mass 3. On the side facing away from the primary disc 15, a pressure ring disc 77 can be in contact with the friction ring 71. Axially between the pressure ring disc 77 and the neck part 43, which neck part 43 projects radially beyond the outside periphery of the neck part 45, there can be an axially acting spring, in this case a plate spring 79, which plate spring 79 can generate the axial bias force of the friction device 69. On the inside periphery at least of the pressure ring disc 77, but preferably also on the inside periphery of the plate spring 79, there can be gear teeth 81 and 83, respectively, which gear teeth 81 and 83 are engaged in matching gear teeth 85 on the outside periphery of the neck part 45. The gear teeth 81 and 83 can serve to guide the components 77, 79 non-rotationally, while allowing these components to move axially on the neck part 45.

Variants of the bearing neck 17 are described below, as they are applicable to the use of the flywheel with two centrifugal masses illustrated in FIG. 1. Components which correspond to identical components in the embodiments described above are identified with the same reference numbers, plus a letter to differentiate them. For example, the reference numerals shown in FIGS. 5–7a have an "a" designation, the reference numerals shown in FIGS. 8–9a have a "b" designation, and the reference numerals shown in FIGS. 10 and 10a have a "c" designation. Reference is made to the preceding description for an explanation of the construction and function of the bearing neck.

Figure 6:
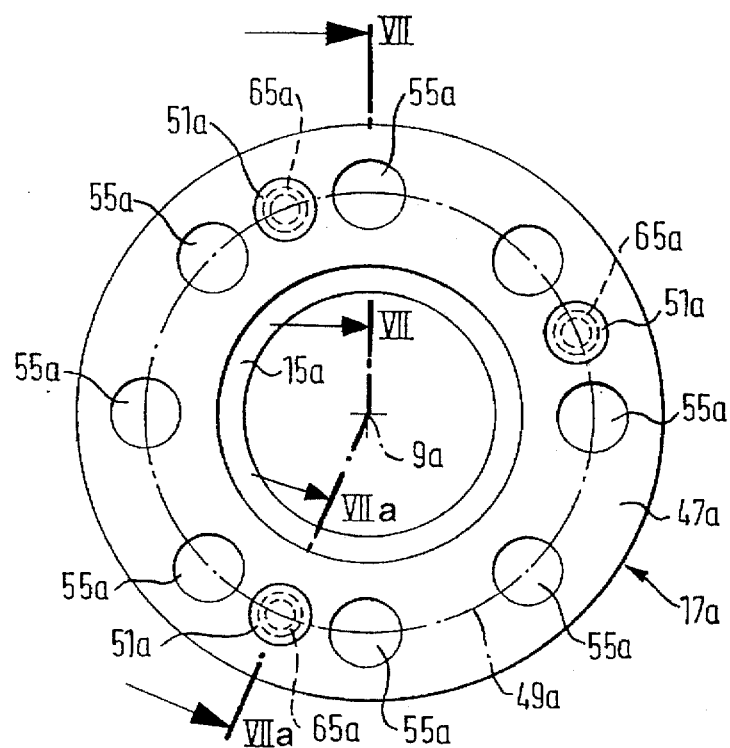
FIG. 6 is an axial view of a first variant of a bearing neck which can be used in the flywheel which has two centrifugal masses illustrated in FIG. 1.
Figure 7:
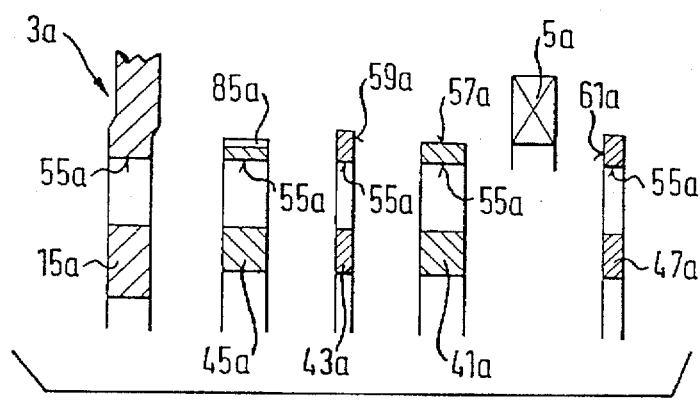
FIG. 7 is a sectional view of the bearing neck, viewed along a Line VII—VII in FIG. 6, which shows an exploded view.
Figure 7A:
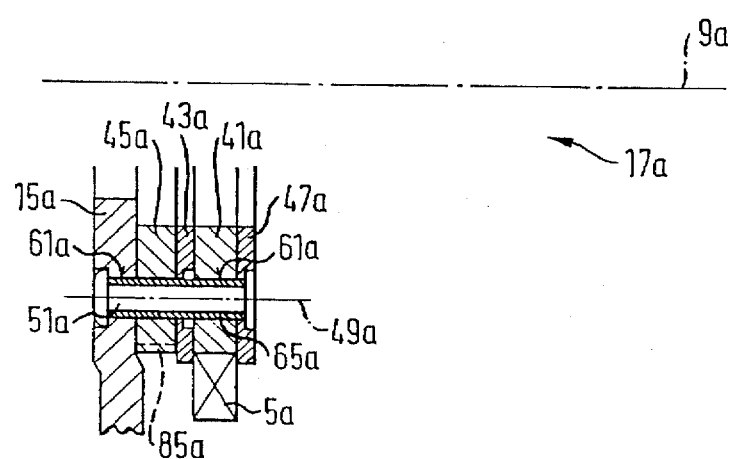
FIG. 7a is a sectional view of the bearing neck, viewed along a line VIIa—VIIa in FIG. 6.

The bearing neck 17a in FIGS. 6, 7 and 7a differs from the bearing neck 17 essentially only in that the rivets 51a, which rivets 51a firmly connect the neck parts 41a, 43a and 45a and the cover plate 47a to one another and to the primary disc 15a, are not located in separate holes in these components, but each of them can instead extend through a respective adapter sleeve 65a with holes 61a being provided for the location of the adapter sleeves 65a. In this manner, the holes 67 indicated above can essentially be eliminated. In accordance with one embodiment of the present invention, the rivets 51a can serve to fasten the components 41a, 43a, 45a, and 47a to one another and to the primary disc 15a, and can also serve to center these components with respect to the primary disc 15a.

Figure 8:
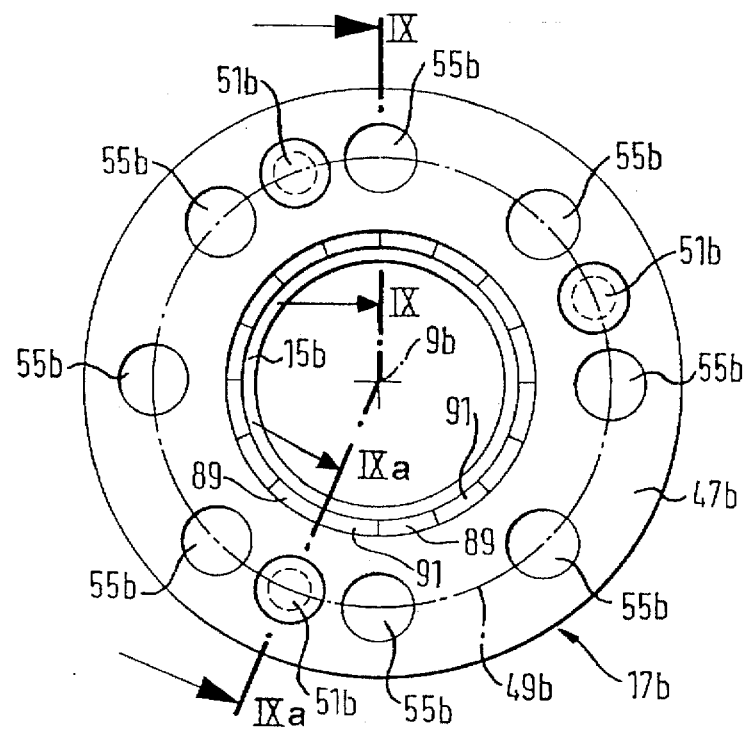
FIG. 8 is an axial section of a second variant of a bearing neck which can be used in the flywheel with two centrifugal masses illustrated in FIG. 1.
Figure 9:
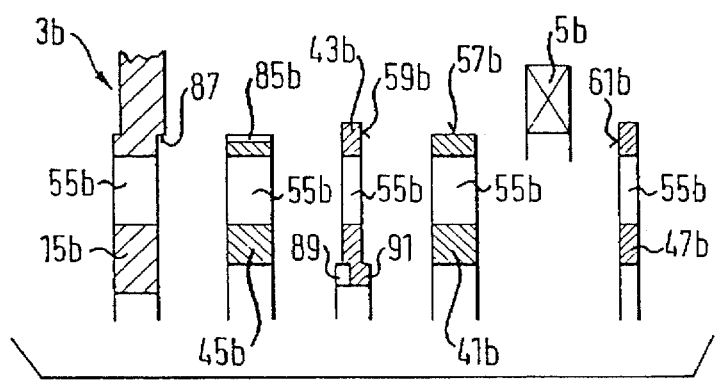
FIG. 9 is a sectional view of the bearing neck, viewed along a Line IX—IX in FIG. 8, which shows an exploded view.
Figure 9A:
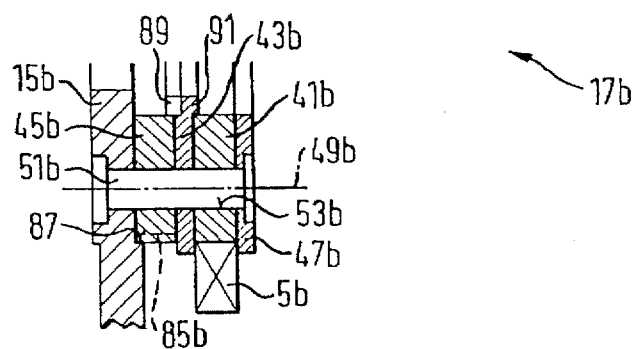
FIG. 9a is a sectional view of the bearing neck, viewed along a line IXa—IXa in FIG. 8.

FIGS. 8, 9 and 9a show a variant which eliminates the adapter sleeves 65, 65a indicated above altogether. Instead, the primary disc 15b can have a ring-shaped centering neck 87, which centering neck 87 is centered with respect to the axis of rotation 9b, and which centering neck 87 radially centers the neck part 45b which is in contact with the primary disc 15b. The centering neck 87 can thereby provide centering radially inside or, as shown, radially outside the part 45b. The neck part 43b located between the neck parts 41b and 45b can have, on its inside periphery on both sides, centering projections 89, 91. The centering projections 89, 91, on one hand, can radially center the neck part 43b on the neck part 45b, and, on the other hand, can radially center the neck part 41b on the neck part 43b. In this manner, the neck part 41b which forms the seat surface 57b for the bearing 5b, can be indirectly centered relative to the primary disc 15b. The centering projections 89, 81 can preferably be in the form of lugs, which lugs can be molded alternately on axially opposite sides in the peripheral direction by pressing, or segmented projections or similar devices. The cover plate 47b can be centered by means of the rivets 51b, because the requirements set for the accuracy of this centering are typically not very strict.

Figure 10:
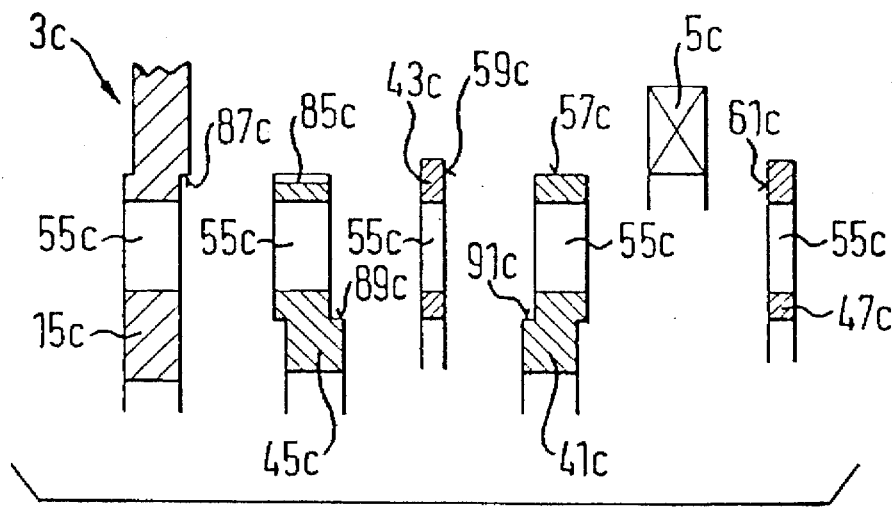
FIG. 10 is a sectional view like FIG. 9 through a variant of the bearing neck illustrated in FIG. 8, FIG. 10 showing an exploded view.
Figure 10A:
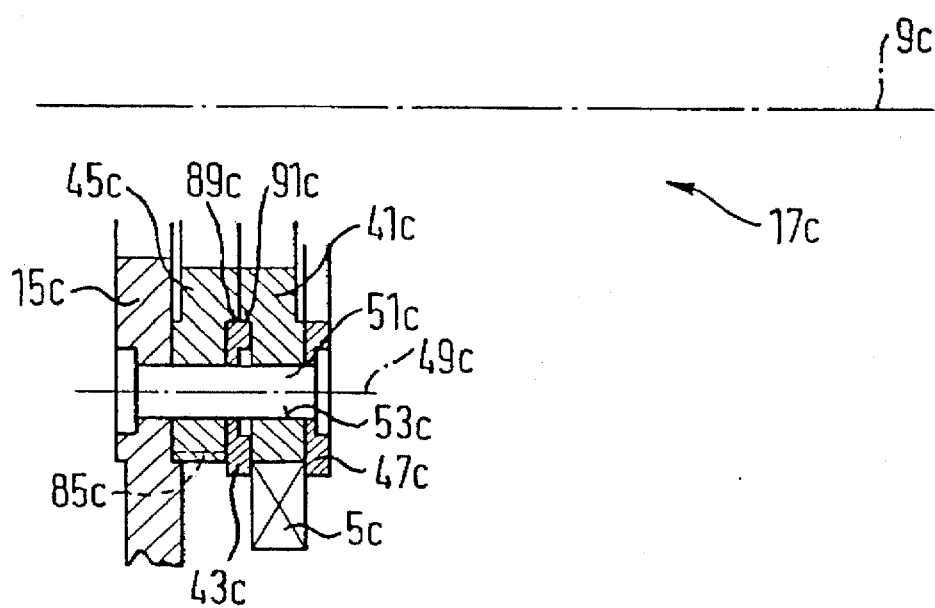
FIG. 10a is a sectional view like FIG. 9a through a variant of the bearing neck illustrated in FIG. 8.

The bearing neck 17c illustrated in FIGS. 10 and 10a differs from the bearing neck 17b illustrated in FIGS. 8, 9 and 9a essentially only in that the centering lugs 89c and 91c provided for centering the neck part 43c on the neck part 45c on one hand, and the neck part 41c on the neck part 43c on the other hand respectively, are not both provided on the neck part 43c as in FIGS. 8, 9 and 9a, but instead are provided on the neck part 45c on one hand, and on the neck part 41c on the other hand. The centering projections 89c, 91c can also be in the form of lugs or segmented projections in the vicinity of the inside periphery of the neck parts 45c, 41c, however, the centering projections 89c, 91c can also be ring-shaped and continuous.

In other words, and in accordance with one embodiment of the present invention, the centering projections 89c, 91c can be the edge portions of a ring-shaped groove located near the inside periphery of the neck parts 45c and 41c. In accordance with an alternative embodiment, the centering projections 89c, 91c can be in the form of discontinuous, partial circular segments which can be distributed around the inner periphery of the neck parts 45c and 41c.

The neck part 43c and the cover plate 47c can preferably be essentially identical to one another. As in the embodiment illustrated in FIGS. 8, 9 and 9a, the neck parts 41c and 45c can also be essentially identical. These parts, too, can also be essentially identical stamped parts, in particular if the neck part 45c does not have any external gear teeth or if these gear teeth are formed into the seat surface 57c, as can also be the case in all of the variants described above.

Figure 11:
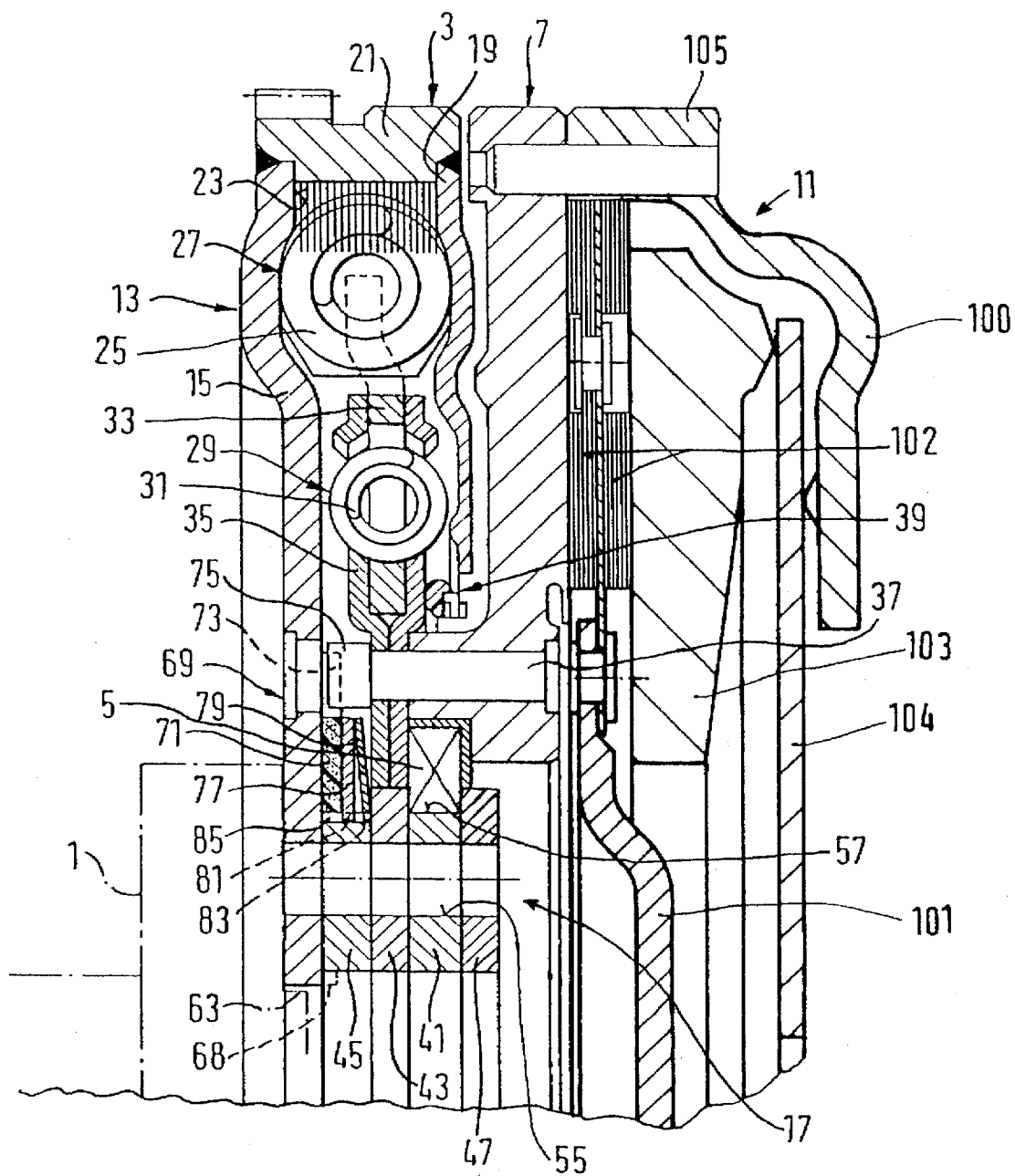
FIG. 11 shows a complete friction clutch assembly.

FIG. 11 shows the depiction of the flywheel assembly shown in FIGS. 1 and 1a, in combination with the friction clutch 11. It should be understood that the friction clutch 11 shown in FIG. 11 can also be utilized with the embodiments shown in FIGS. 2–10.

In accordance with the embodiment shown in FIG. 11, the friction clutch 11 can preferably include a pressure plate 103, which pressure plate 103 can be fastened to a clutch housing 100 so that the pressure plate 103 can move axially, but non-rotatably with respect to the housing 100. The outer area 105 of the housing 100 can be fastened to the second mass 7 by means of fasteners (not shown). The pressure plate 103 can be pressurized by a membrane spring or plate spring 104, which membrane spring 104 can be braced both on the pressure plate 103, and also on the clutch housing 100. The pressure plate 103, by means of the membrane spring 104, can engage friction linings 102 of a clutch disc 101 with the rotating second mass 7, thereby also causing the clutch disc 101 to rotate. The clutch disc 101 can then, in turn, cause a shaft of a transmission (not shown) to rotate with the engine.

Figure 12:
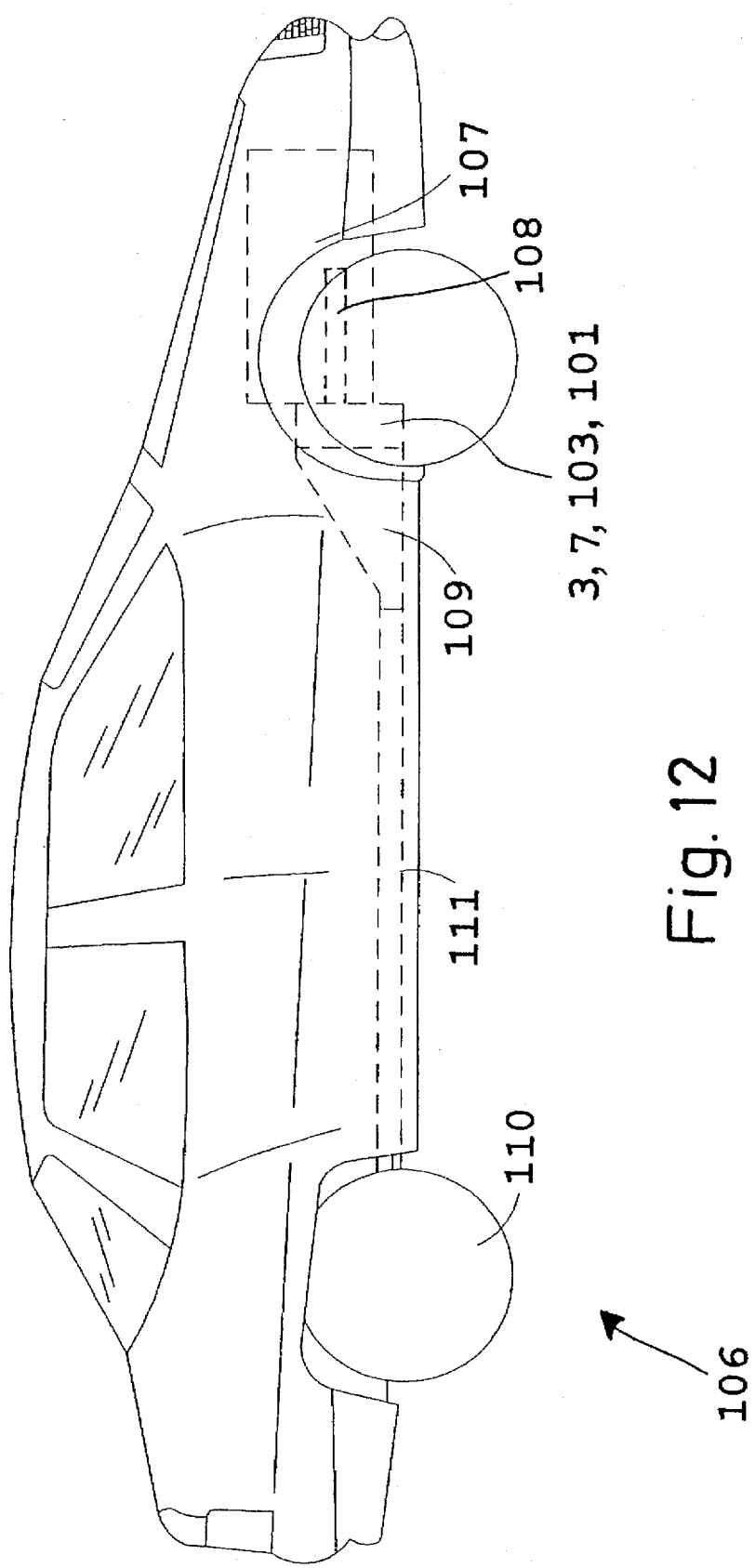
FIG. 12 shows a typical motor vehicle incorporating the present invention.

FIG. 12 shows what could be considered to be a typical motor vehicle 106, which motor vehicle 106 can include an internal combustion engine 107 mounted in the forward portion thereof. The combustion engine 107 can preferably have a crankshaft 108 for outputting mechanical rotary power generated by the engine 107. The motor vehicle 106 can also include a transmission 109 for transmitting mechanical power from the crankshaft 108 of the engine 107 to the wheels 110, via a drive shaft 111. If the motor vehicle 106 has a manual transmission 109, the masses 3, 7, pressure plate 103, and clutch disc 101 may also be included for engaging the transmission 109 with the engine 107.

One feature of the invention resides broadly in the flywheel which has two centrifugal masses and is located in the drive train of a motor vehicle which is powered by an internal combustion engine, comprising a first centrifugal mass 3 which can be rotationally fastened to a crankshaft 1 of the internal combustion engine and which can rotate around an axis of rotation 9, a bearing neck 17 which is guided radially equiaxially relative to the first centrifugal mass 3 by centering means 65, 87, 89, 91, fastening means 51 which fix the bearing neck 17 in position relative to the first centrifugal mass 3, a second centrifugal mass 7 which can rotate around the axis of rotation 9 relative to the first centrifugal mass 3, a system of rotational vibration dampers 13 with an input component which is non-rotationally connected to the first centrifugal mass 3, and an output component 35 which is connected with rotational elasticity to the input component 15, 19 and is non-rotationally connected to the second centrifugal mass 7, characterized by the fact that the bearing neck 17 comprises at least two separate neck parts 41, 43, 45, the first neck part 41 of which neck parts 41, 43, 45, on its outer periphery, forms a seat surface 57 for the bearing 5, and a second neck part 43 of which is located on the side of the first neck part 41 which is axially closer to the crankshaft 1, and projects radially beyond the seat surface 57 to form an axial stop shoulder 59 for the bearing 5, and that the centering means 65; 87, 89, 91 radially center the neck parts 41, 43, 45, independently of the fastening means 51, in relation to one another and in relation to the first centrifugal mass 3.

Another feature of the invention resides broadly in the flywheel with two centrifugal masses characterized by the fact that the centering means comprise a multiplicity of adapter sleeves 65 which provide radial support and which are offset in the peripheral direction, and the longitudinal dimension of which extends in the direction of the axis of rotation 9 and which are clamped in holes 67 which are oriented axially in relation to one another at least in the first neck part 41 and each of the neck parts 43, 45 located axially between the first centrifugal mass 3 and the first neck part 41, and in particular also in the first centrifugal mass 3.

Yet another feature of the invention resides broadly in the flywheel with two centrifugal masses characterized by the fact that the first centrifugal mass 3b, c, the first neck part 41b, c and each of the neck parts 43b, c, 45b, c located axially between the first centrifugal mass 3b, c and the first neck part 41b, c have centering surfaces which radially center these components, which are located axially next to one another, in relation to one another.

Still another feature of the invention resides broadly in the flywheel with two centrifugal masses characterized by the fact that the fastening means comprise a multiplicity of rivets 51 which are offset in the peripheral direction and which run through holes which are oriented axially in relation to one another in the first centrifugal mass 3, the first neck part 41 and each of the neck parts 43, 45 located axially between the first centrifugal mass 3 and the first neck part 41, and fasten the neck parts 41, 43, 45 to the first centrifugal mass 3.

Another feature of the invention resides broadly in the flywheel with two centrifugal masses characterized by the fact that on the side of the first neck part 41 facing axially away from the second neck part 43 there is a cover plate 47 which projects radially beyond the seat surface 57 to form an axial stop shoulder 61 for the bearing 5, and that the rivets 51 also run through the cover plate 47 and fasten it, together with the neck parts 41, 43, 45, to the first centrifugal mass 3.

Yet another feature of the invention resides broadly in the flywheel with two centrifugal masses characterized by the fact that the adapter sleeves 65 are also engaged in holes 67 of the cover plate 47 and radially center the cover plate 47 relative to the first centrifugal mass 3.

Still another feature of the invention resides broadly in the flywheel with two centrifugal masses characterized by the fact that at least some of the rivets 51a each run through respective adapter sleeves 65a, and in particular all of the rivets 51a each run through respective adapter sleeves 65a.

A further feature of the invention resides broadly in the flywheel with two centrifugal masses characterized by the fact that at least some of the rivets 51 are offset in the peripheral direction in relation to the adapter sleeves 65.

Another feature of the invention resides broadly in the flywheel with two centrifugal masses characterized by the fact that the rivets 51b, c radially center the cover plate 47b, c relative to the first centrifugal mass 3b, c and the neck parts 41b, c, 43b, c, 45b, c.

Yet another feature of the invention resides broadly in the flywheel with two centrifugal masses characterized by the fact that the cover plate 47 and the second neck part 43 have essentially the same shape.

Still another feature of the invention resides broadly in the flywheel with two centrifugal masses characterized by the fact that a third neck part 45 of the neck parts 41, 43, 45 is located axially between the second neck part 43 and the first centrifugal mass 3.

A further feature of the invention resides broadly in the flywheel with two centrifugal masses characterized by the fact that the first 41 and the third 45 neck parts have essentially the same shape.

Another feature of the invention resides broadly in the flywheel with two centrifugal masses, characterized by the fact that radially beyond the third neck part 45 and coaxially with it, are located ring elements 71, 77, 79 of a friction device 69 of the torsional vibration damper system 13, and that at least one of the ring elements 77, 79 and the third ring part 45 have interlocking mechanisms 81, 83, 85 which connect the one ring element 77, 79 to the third neck part 45 non-rotationally, but so that it can move axially.

Yet another feature of the invention resides broadly in the flywheel with two centrifugal masses characterized by the fact that the second neck part 43b, on axially opposite sides, has axially projecting centering projections 89, 91 which radially center the first neck part 41b on one hand, and the second neck part 45b on the other hand, in relation to one another.

Still another feature of the invention resides broadly in the flywheel with two centrifugal masses characterized by the fact that the first neck part 41c and the third neck part 45c have axially projecting centering projections 89c, 91c on their sides axially facing one another, which radially center the first neck part 41c and the third neck pat 45c on the second neck part 43c and relative to one another.

A further feature of the invention resides broadly in the flywheel with two centrifugal masses characterized by the fact that the neck parts 41, 43, 45 and the cover plate 47, if any, which fixes the bearing 5, are realized in the form of stamped parts.

Another feature of the invention resides broadly in the flywheel with two centrifugal masses characterized by the fact that the first neck part 41, and in particular only the first neck part 41, has a ground outer peripheral surface, and in particular outer peripheral surfaces ground using centerless grinding, and which forms the seat surface 57 for the bearing.

Types of transmissions in which the present invention may be incorporated may be disclosed in the following U.S. Patents: U.S. Pat. No. 5,199,316 to Hoffman on Apr. 6, 1993, entitled "Fully-synchronized Multiple Speed Manual Transmission for Motor Vehicles"; U.S. Pat. No. 4,458,551 to Winter on Jul. 10, 1984, entitled "Manual Transmission"; and U.S. Pat. No. 3,858,460 to Porter et al. on Jan. 1, 1975, entitled "Four Speed Manual Transmission and Control".

Types of clutch assemblies which may be utilized in accordance with the present invention may be disclosed in the following U.S. Patents: U.S. Pat. No. 4,684,007 to Maucher on Aug. 4, 1987, entitled "Clutch Plate"; U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

Types of two-mass flywheels and bearings for use in two-mass flywheels which may be utilized in accordance with the present invention may be disclosed in the following U.S. Patents: U.S. Pat. No. 5,103,688 to Kuhne on Apr. 14, 1992, entitled "Two-mass Flywheel"; U.S. Pat. No. 4,777,843 to Bopp on Oct. 18, 1988, entitled "Two-mass Flywheel Assembly with Viscous Damping Assembly"; U.S. Pat. No. 5,195,396 to Kamiya et al. on Mar. 23, 1993, entitled "Torque Variation Absorbing Device"; and U.S. Pat. No. 4,946,420 to Jackel on Aug. 7, 1990, entitled "Apparatus for Damping Torsional Vibrations".

Types of friction devices for use in two-mass flywheels which may be utilized in accordance with the present invention may be disclosed in the following U.S. Patents: U.S. Pat. No. 4,947,706 to Umeyama et al. on Sep. 4, 1987, entitled "Flywheel With a Torsional Damper"; and U.S. Pat. No. 5,154,683 to Phelps on Nov. 19, 1991, entitled "Clutch Having Rotatable Friction Rings".

Centerless grinding machines which may be utilized in accordance with the present invention may be disclosed in the following U.S. Patents: U.S. Pat. No. 4,926,603 to Frost et al. on May 22, 1990, entitled "Centerless Grinding"; and U.S. Pat. No. 4,930,260 to Itoh et al. on Nov. 10, 1988, entitled "Centerless Grinding Apparatus of Through-Feed Type".

All of the patents, patent applications and publications recited herein are hereby incorporated by reference as if set forth in their entirety herein.

The corresponding foreign patent publication applications, namely, Federal Republic of Germany Patent Application No. P 44 43 453.7, filed on Dec. 7, 1994, having inventor Joachim Lindner, and DE-OS P 44 43 453.7 and DE-PS P 44 43 453.7, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A flywheel assembly for a motor vehicle for transmitting mechanical rotary power from an internal combustion engine to a transmission, said flywheel assembly comprising:

a first flywheel portion, said first flywheel portion having an axis of rotation and defining an axial direction parallel to said axis of rotation;

said first flywheel portion comprising means for fastening said first flywheel portion to a crankshaft of an internal combustion engine;

a second flywheel portion disposed adjacent said first flywheel portion, said second flywheel portion being rotatable with respect to said first flywheel portion;

bearing means for guiding said second flywheel portion with respect to said first flywheel portion;

means for mounting said bearing means;

means for fastening said mounting means to said first flywheel portion;

said mounting means comprising:

a first neck part;

a second neck part disposed adjacent said first neck part, said second neck part comprising a seat surface for said bearing means; and said first neck part comprising a portion extending radially outwardly beyond said seat surface of said second neck part and forming a stop shoulder for said bearing means;

means for centering said mounting means in a radial direction with respect to said first flywheel portion and for centering said first neck part and said second neck part with respect to one another;

said second neck part having a first side facing said first flywheel portion and a second side facing away from said first side, said first neck part being disposed adjacent said first side of said second neck part;

said mounting means further comprising a third neck part disposed axially between said first flywheel portion and said first neck part; and said centering means centering said first neck part, said second neck part, and said third neck part with respect to one another.

2. The flywheel assembly according to claim 1 wherein:

said means for fastening said mounting means comprises a plurality of rivets;

said first flywheel portion, said first neck part, said second neck part, and said third neck part each comprise a plurality of holes disposed about said axis of rotation;

each of said holes of said first flywheel portion being both substantially axially and substantially circumferentially aligned with corresponding ones of said holes of each of said first, second and third neck parts; and each of said rivets being disposed in said aligned holes of said first flywheel portion and said first, second and third neck parts to fasten said first, second and third neck parts to said first flywheel portion.

3. The flywheel assembly according to claim 2 wherein:

said mounting means further comprises a cover plate disposed adjacent said second side of said second neck part, said cover plate comprising a portion extending radially outwardly beyond said seat surface of said second neck part and forming an additional stop shoulder for said bearing means;

said cover plate further comprises a plurality of holes being both substantially axially and substantially circumferentially aligned with said aligned holes of said first flywheel portion and said first, second and third neck parts; and each of said rivets being disposed in said aligned holes of said first flywheel portion, said first, second and third neck parts, and said cover plate to fasten said cover plate to said first flywheel portion.

4. The flywheel assembly according to claim 3 wherein:

said flywheel assembly further comprises a torsional vibration damper for damping relative rotational movements between said first flywheel portion and said second flywheel portion;

said torsional vibration damper comprising:
an input portion, said input portion being non-rotationally fastened to said first flywheel portion;
an output portion, said output portion being non-rotationally fastened to said second flywheel portion;
means for connecting said input portion to said output portion, said connecting means for permitting relative rotational movement between said input portion and said output portion;
a friction device disposed radially outwardly of said third neck part, said friction device comprising at least one ring element having an inner periphery;
said third neck part having an outer periphery; and
said friction device further comprising means for interlocking said outer periphery of said third neck part with said inner periphery of said at least one ring element such that said at least one ring element is axially movable but non-rotatably movable with respect to said third neck part.

5. The flywheel assembly according to claim 4 wherein:

said centering means comprises a plurality of adapter sleeves;

each of said first flywheel portion and said first, second and third neck parts comprise an additional plurality of holes disposed about said axis of rotation;

each of said additional plurality of holes of said first flywheel portion being both substantially axially and substantially circumferentially aligned with corresponding ones of said additional holes of each of said first, second and third neck parts;

each of said adapter sleeves being disposed in said aligned additional holes of said first flywheel portion and said first, second and third neck parts; and said adapter sleeves being configured for providing radial support for said first, second and third neck parts.

6. The flywheel assembly according to claim 5 wherein;

said cover plate further comprises a plurality of additional holes being both substantially axially and substantially circumferentially aligned with said aligned additional holes of said first flywheel portion and said first, second and third neck parts; and each of said adapter sleeves being disposed in said aligned additional holes of said first flywheel portion, said first, second and third neck parts and said cover plate to center said cover plate with respect to said first flywheel portion.

7. The flywheel assembly according to claim 6 wherein said first, second and third neck parts and said cover plate each comprise stamped parts.

8. The flywheel assembly according to claim 7 wherein:

said cover plate and said first neck part comprise substantially similar configurations; and said second neck part and said third neck part each have an outer diameter and an inner diameter defined substantially perpendicular with respect to the axis and and a width defined substantially parallel with respect to the axis;

said outer diameter and said inner diameter of said second neck part being similar to said outer diameter and said inner diameter of said third neck part, respectively; and said width of said second neck part being similar to said width of said third neck part.

9. The flywheel assembly according to claim 8 wherein:

each of said rivets are circumferentially offset from each of said adapter sleeves;

said second neck part has an outer periphery, said outer periphery of said second neck part comprising said seat surface;

said at least one ring element comprises three ring elements, said three ring elements being first, second and third ring elements, each of said first, second and third ring elements having an inner periphery;

said first, second and third ring elements all being disposed between said first flywheel portion and said first neck part, said first ring element being disposed immediately adjacent said first flywheel portion and said third ring element being disposed immediately adjacent said first neck part;

said second ring element being disposed between said first ring element and said third ring element;

said second ring element comprising a pressure ring;

said first ring element comprising a friction ring;

said means for interlocking comprising gear teeth disposed on said inner periphery of said pressure ring;

said third ring element comprising a plate spring;

said means for interlocking further comprising gear teeth disposed on said inner periphery of said plate spring;

said means for interlocking further comprising gear teeth disposed on said outer periphery of said third neck part;

said gear teeth of said plate spring and said gear teeth of said pressure ring being engaged with said gear teeth of said third neck part;

said seat surface is disposed parallel to said axis;

said stop shoulders of said cover plate and said first neck part are both disposed perpendicular to said axis to form axial stop shoulders for said bearing means;

each of said first, second, and third neck parts, said first flywheel portion, and said cover plate comprise a plurality of holes for receiving screws for fastening each of said first, second, and third neck parts, said first flywheel portion and said cover plate to the crankshaft;

each of said additional holes for receiving said adapter sleeves being disposed between two adjacent ones of said holes for receiving screws of each of said first, second and third neck parts, said first flywheel portion, and said cover plate;

each of said holes for receiving said rivets being disposed between two adjacent ones of said holes for receiving screws of each of said first, second and third neck parts, said first flywheel portion, and said cover plate;

said cover plate being a first cover plate;

said first flywheel portion comprises a primary disc, a ring member and a second cover plate;

said primary disc having an inner circumferential portion and an outer circumferential portion, said inner circumferential portion being disposed immediately adjacent said friction ring and said third neck part;

said outer circumferential portion being disposed adjacent said torsional vibration damper;

said ring member extending between said outer circumferential portion of said primary disc and said second cover plate; and said input portion of said torsional vibration damper comprising said second cover plate.

10. The flywheel assembly according to claim 4 wherein said centering means comprises:

a shoulder disposed on said first flywheel portion, said shoulder comprising a centering surface; and said centering surface engaging with said outer periphery of said third neck part to center at least said third neck part with respect to said first flywheel portion.

11. The flywheel assembly according to claim 10 wherein:

said first neck part has a first side and a second side facing away from one another, said first side facing said second neck part and said second side facing said third neck part;

each of said first and second neck parts have an outer periphery and an inner periphery disposed within said outer periphery;

said third neck part has an inner periphery disposed within said outer periphery of said third neck part;

said centering means further comprising:

a first projection disposed on said inner periphery of said first neck part and disposed on said first side of said first neck part;

said first projection extending from said first side of said first neck part axially towards said second neck part;

said first projection engaging said inner periphery of said second neck part to radially center said second neck part with respect to said third neck part;

a second projection disposed on said inner periphery of said first neck part and disposed on said second side of said first neck part;

said second projection extending from said second side of said first neck part axially towards said third neck part; and said second projection engaging said inner periphery of said third neck part to radially center said third neck part with respect to said second neck part.

12. The flywheel assembly according to claim 11 wherein:

said second neck part and said third neck part each have an outer diameter and an inner diameter defined substantially perpendicular with respect to the axis and a width defined substantially parallel with respect to the axis;

said outer diameter and said inner diameter of said second neck part being similar to said outer diameter and said inner diameter of said third neck, respectively;

said width of said second neck part being similar to said width of said third neck part;

said outer periphery of said second neck part comprises said seat surface;

said at least one ring element comprises three ring elements, said three ring elements being first, second and third ring elements, each of said first, second and third ring elements having an inner periphery;

said first, second and third ring elements all being disposed between said first flywheel portion and said first neck part, said first ring element being disposed immediately adjacent said first flywheel portion and said third ring element being disposed immediately adjacent said first neck part;

said second ring element being disposed between said first ring element and said third ring element;

said second ring element comprising a pressure ring;

said first ring element comprising a friction ring;

said means for interlocking comprising gear teeth disposed on said inner periphery of said pressure ring;

said third ring element comprising a plate spring;

said means for interlocking further comprising gear teeth disposed on said inner periphery of said plate spring;

said means for interlocking further comprising gear teeth disposed on said outer periphery of said third neck part;

said gear teeth of said plate spring and said gear teeth of said pressure ring being engaged with said gear teeth of said third neck part;

said seat surface is disposed parallel to said axis;

said stop shoulders of said cover plate and said first neck part are both disposed perpendicular to said axis to form axial stop shoulders for said bearing means;

each of said first, second, and third neck parts, said first flywheel portion, and said cover plate comprise a plurality of holes for receiving screws for fastening each of said first, second, and third neck parts, said first flywheel portion and said cover plate to a crankshaft;

each of said holes for receiving said rivets being disposed between two adjacent ones of said holes for receiving screws of each of said first, second and third neck parts, said first flywheel portion, and said cover plate;

said cover plate being a first cover plate;

said first flywheel portion comprises a primary disc, a ring member and a second cover plate;

said primary disc having an inner circumferential portion and an outer circumferential portion, said inner circumferential portion being disposed immediately adjacent said friction ring and said third neck part;

said outer circumferential portion being disposed adjacent said torsional vibration damper;

said ring member extending between said outer circumferential portion of said primary disc and said second cover plate; and said input portion of said torsional vibration damper comprising said second cover plate.

13. The flywheel assembly according to claim 10 wherein:

each of said first and second neck parts comprise an outer periphery and an inner periphery disposed within said outer periphery;

said third neck part has an inner periphery disposed within said outer periphery of said third neck part;

said third neck part has a first side and a second side facing away from one another, said first side facing said second neck part;

said centering means further comprising:

a first projection disposed on said inner periphery of said second neck part and disposed on said first side of said second neck part;

said first projection extending from said first side of said second neck part axially towards said third neck part;

said first projection engaging said inner periphery of said first neck part to radially center said second neck part with respect to said first neck part and with respect to said third neck part;

a second projection disposed on said inner periphery of said third neck part and disposed on said first side of said third neck part said second projection extending from said first side of said third neck part axially towards said second neck part; and said second projection engaging said inner periphery of said first neck part to radially center said third neck part with respect to said first neck part and with respect to said second neck part.

14. The flywheel assembly according to claim 13 wherein:

said cover plate and said first neck part comprise substantially similar configurations;

said second neck part and said third neck part each have an outer diameter and an inner diameter defined substantially perpendicular with respect to the axis and a width defined substantially parallel with respect to the axis;

said outer diameter and said inner diameter of said second neck part being similar to said outer diameter and said inner diameter of said third neck part, respectively;

said width of said second neck part being similar to said width of said third neck part;

said outer periphery of said second neck part comprises said seat surface;

said at least one ring element comprises three ring elements, said three ring elements being first, second and third ring elements, each of said first, second and third ring elements having an inner periphery;

said first, second and third ring elements all being disposed between said first flywheel portion and said first neck part, said first ring element being disposed immediately adjacent said first flywheel portion and said third ring element being disposed immediately adjacent said first neck part;

said second ring element being disposed between said first ring element and said third ring element;

said second ring element comprising a pressure ring;

said first ring element comprising a friction ring;

said means for interlocking comprising gear teeth disposed on said inner periphery of said pressure ring;

said third ring element comprising a plate spring;

said means for interlocking further comprising gear teeth disposed on said inner periphery of said plate spring;

said means for interlocking further comprising gear teeth disposed on said outer periphery of said third neck part;

said gear teeth of said plate spring and said gear teeth of said pressure ring being engaged with said gear teeth of said third neck part;

said seat surface is disposed parallel to said axis;

said stop shoulders of said cover plate and said first neck part are both disposed perpendicular to said axis to form axial stop shoulders for said bearing means;

each of said first, second, and third neck parts, said first flywheel portion, and said cover plate comprise a plurality of holes for receiving screws for fastening each of said first, second, and third neck parts, said first flywheel portion and said cover plate to a crankshaft;

each of said holes for receiving said rivets being disposed between two adjacent ones of said holes for receiving screws of each of said first, second and third neck parts, said first flywheel portion, and said cover plate;

said cover plate being a first cover plate;

said first flywheel portion comprises a primary disc, a ring member and a second cover plate;

said primary disc having an inner circumferential portion and an outer circumferential portion, said inner circumferential portion being disposed immediately adjacent said friction ring and said third neck part;

said outer circumferential portion being disposed adjacent said torsional vibration damper;

said ring member extending between said outer circumferential portion of said primary disc and said second cover plate; and said input portion of said torsional vibration damper comprising said second cover plate.

15. The flywheel assembly according to claim 4 wherein:

said centering means comprises a plurality of adapter sleeves; end each of said adapter sleeves being disposed about one of said rivets and being disposed in a corresponding one of said aligned holes of said first flywheel portion, said first, second and third neck parts, and said cover plate.

16. The flywheel assembly according to claim 15 wherein said adapter sleeves and said rivets being configured for centering said first, second and third neck parts and said cover plate with respect to said first flywheel portion.

17. The flywheel assembly according to claim 16 wherein:

said cover plate and said first neck part comprise substantially similar configurations;

said second neck part and said third neck part each have an outer diameter and an inner diameter defined substantially perpendicular with respect to the axis and a width defined substantially parallel with respect to the axis;

said outer diameter and said inner diameter of said second neck part being similar to said outer diameter and said inner diameter of said third neck part, respectively;

said width of said second neck part being similar to said width of said third neck part;

said outer periphery of said second neck part comprises said seat surface;

said at least one ring element comprises three ring elements, said three ring elements being first, second and third ring elements, each of said first, second and third ring elements having an inner periphery;

said first, second and third ring elements all being disposed between said first flywheel portion and said first neck part, said first ring element being disposed immediately adjacent said first flywheel portion and said third ring element being disposed immediately adjacent said first neck part;

said second ring element being disposed between said first ring element and said third ring element;

said second ring element comprising a pressure ring;

said first ring element comprising a friction ring;

said means for interlocking comprising gear teeth disposed on said inner periphery of said pressure ring;

said third ring element comprising a plate spring;

said means for interlocking further comprising gear teeth disposed on said inner periphery of said plate spring;

said means for interlocking further comprising gear teeth disposed on said outer periphery of said third neck part;

said gear teeth of said plate spring and said gear teeth of said pressure ring being engaged with said gear teeth of said third neck part;

said seat surface is disposed parallel to said axis;

said stop shoulders of said cover plate and said first neck part are both disposed perpendicular to said axis to form axial stop shoulders for said bearing means;

each of said first, second, and third neck parts, said first flywheel portion, and said cover plate comprise a plurality of holes for receiving screws for fastening each of said first, second, and third neck parts, said first flywheel portion and said cover plate to a crankshaft;

each of said holes for receiving said rivets being disposed between two adjacent ones of said holes for receiving screws of each of said first, second and third neck parts, said first flywheel portion, and said cover plate;

said cover plate being a first cover plate;

said first flywheel portion comprises a primary disc, a ring member and a second cover plate;

said primary disc having an inner circumferential portion and an outer circumferential portion, said inner circumferential portion being disposed immediately adjacent said friction ring and said third neck part;

said outer circumferential portion being disposed adjacent said torsional vibration damper;

said ring member extending between said outer circumferential portion of said primary disc and said second cover plate; and said input portion of said torsional vibration damper comprising said second cover plate.

18. A flywheel assembly for a motor vehicle for transmitting mechanical rotary power from an internal combustion engine to a transmission, said flywheel assembly comprising:

a first flywheel portion, said first flywheel portion having an axis of rotation and defining an axial direction parallel to said axis of rotation;

said first flywheel portion comprising means for fastening said first flywheel portion to a crankshaft of an internal combustion engine;

a second flywheel portion disposed adjacent said first flywheel portion, said second flywheel portion being rotatable with respect to said first flywheel portion;

bearing means for guiding said second flywheel portion with respect to said first flywheel portion;

means for mounting said bearing means;

means for fastening said mounting means to said first flywheel portion;

said mounting means comprising:

a first neck part;

a second neck part disposed adjacent said first neck part, said second neck part comprising a seat surface for said bearing means; and said first neck part comprising a portion extending radially outwardly beyond said seat surface of said second neck part and forming a stop shoulder for said bearing means;

said second neck part having a first side facing said first flywheel portion and a second side facing away from said first side, said first neck part being disposed adjacent said first side of said second neck part; and a third neck part disposed axially between said first flywheel portion and said first neck part.

19. The flywheel assembly according to claim 18 further comprising means for centering said mounting means in a radial direction with respect to said first flywheel portion and for centering said first neck part, said second neck part, and said third neck part with respect to one another.

* * * * *

UNITED STATES PATENT AND TRADEMARK OFFICE
CERTIFICATE OF CORRECTION

PATENT NO. : 5,688,177
DATED : November 18, 1997
INVENTOR(S) : Joachim LINDNER

It is certified that error appears in the above-identified patent and that said Letters Patent is hereby corrected as shown below:

In column 5, line 4, after 'for', delete "guirespect to the first" and insert --guiding the second--.

In column 17, line 53, Claim 12, after 'third', delete "neck," and insert --neck part,--.

Signed and Sealed this

Seventh Day of April, 1998

Attest:

BRUCE LEHMAN

Attesting Officer

Commissioner of Patents and Trademarks